United States Patent Office 2,855,380
Patented Oct. 7, 1958

2,855,380

ORGANOSILOXANE RESINS AND INDIUM CARBOXYLATE

Robert C. Hedlund, Midland, Mich., assignor to Dow Corning Corporation, Midland, Mich., a corporation of Michigan No Drawing. Application April 18, 1955
Serial No. 502,193

12 Claims. (Cl. 260—46.5)

This invention relates to new and improved organosiloxane resin compositions.

Organosiloxane resins are well-known materials available commercially and employed in a wide variety of applications. Such resins are used for paints, varnishes, and other protective coatings, molding resins, coating resins, laminating resins and the like. These resins are noted for their thermal stability and are generally preferred for those applications where high temperatures will be encountered.

The need for further improving the high temperature characteristics is, however, accompanied by the equally important necessity of reducing the cure time for resins. Further characteristics sought are high flex strength and general physical strength. Heretofore, it has not been possible to produce an organosiloxane resin combining the characteristics of short cure, excellent high temperature characteristics and superior physical strength. The organosiloxane resins known and used prior to this invention could be compounded to obtain a relatively short cure time only by sacrificing some other desired property such as high temperature stability as evidenced by the craze life of the cured resins at high temperature. Similarly, long craze life could be achieved by sacrificing cure time and high physical strength could be achieved at the expense of craze life and/or cure time. In short, the desired combination of properties was not heretofore available.

It is an object of this invention to prepare organosiloxane resins having a short cure time without sacrificing any other properties. Another object is to prepare organosiloxane resins having long craze life at high temperatures and superior flex strength as well as short cure time. Other objects and advantages of this invention are detailed in or will be apparent from the following specification and appended claims.

This invention relates to a composition of matter consisting essentially of an organosiloxane of the formula

$$R_nSiO_{\frac{4-n}{2}}$$

wherein R represents any radical selected from the group consisting of monovalent hydrocarbon radicals, halogenated monovalent hydrocarbon radicals, and halophenoxymethyl radicals, and $n$ has an average value of from .9 to 1.7, and .001 to 5.0 percent by weight based on the weight of the organosiloxane of indium added as an indium salt of a carboxylic acid and up to 5.0 percent by weight based on the weight of the organosiloxane of cerium added as a cerium salt of a carboxylic acid.

The organosiloxanes which are operative herein are polymeric resinous materials. These resins range from low polymers of few units per molecule to high polymers having many units per molecule. There are on the average from .9 to 1.7 organic groups per silicon atom in the molecule. The organic substituents can be any monovalent hydrocarbon radical, any halogenated monovalent hydrocarbon radical, and/or any halophenoxymethyl radical. Illustrative of the operative organic substituents are alkyl radicals such as methyl, ethyl, butyl, and octadecyl; alkenyl radicals such as vinyl and allyl; aryl radicals such as phenyl, naphthyl and xenyl; allicyclic radicals such as cyclohexenyl, cyclopentyl and cyclohexyl; alkaryl radicals such as tolyl and xylyl; aralkyl radicals such as benzyl; and/or any halogenated monovalent hydrocarbon radicals such as tetrafluoroethyl, perfluorovinyl, dichlorophenyl, α,α,α-trifluorotolyl and so forth; and/or any halophenoxymethyl radical such as described in the copending application for U. S. patent, Serial No. 470,-532, filed November 22, 1954, now U. S. Patent No. 2,783,262, the disclosure of which is hereby incorporated in this application by reference. All of the organic substituents in the polymeric organosiloxane can be the same or they can be different.

The monovalent hydrocarbon substituted siloxanes and halogenated monovalent hydrocarbon substituted siloxanes are commercially available materials produced by well-known standardized methods. The preparation of halophenoxymethylsiloxanes is further described and detailed in the above noted application for U. S. patent, Serial No. 470,532.

It has been discovered that the desired properties can be attained by admixing with the resins small amounts of indium alone or combinations of indium and cerium. These metals are added as salts of any carboxylic acid. Operative herein are the indium and cerium salts of any saturated or unsaturated, monocarboxylic or polycarboxylic acid. Examples of the salts of indum and cerium which are operative herein includes acetates, adipates, benzoates, citrates, cyanacetates, fumarates, lactates, salicylates, stearates, toluylates, naphthenates, hexoates, naphthoates, and so forth. Salts of higher molecular weight acids such as naphthenates are preferred when the ultimate use of the resin is for paints or other protective coatings. Similarly, salts of lower molecular weight acids such as octoates are preferred for laminating resins because they do not darken the ultimate product during the heat-curing steps.

The indium and cerium salts are added in amounts such that the metal content of the salt forms up to 5 percent by weight of the organosiloxane. Amounts larger than 5 percent are impractical because of the deleterious effect on shelf life, because of the difficulty of obtaining adequate dispersion of more than this amount of such salt, and because of the incompatibility of larger amounts of such salts in the defined organosiloxane.

The advantages attained through the use of the defined indium salts include an outstanding improvement in the cure time of the resins and substantial improvement in the high temperature craze life and flex strength of the resins. The improvements attained with the indium and combination of indium and cerium salts of this invention are totally unexpected in view of the prior art concerning the addition of other metallic curing catalysts and/or stabilizers. None of the materials heretofore employed give the remarkable improvements attained herewith.

The preferred embodiment of this invention is a mixture of any of the defined organosiloxanes and .001 to 5.0 percent by weight of indium added as a salt of any carboxylic acid and .001 to 5.0 percent by weight of cerium added as a salt of any carboxylic acid. This combination achieves the optimum in curing time, craze life, and flex strength.

The resins of this invention are useful as laminating resins, protective coatings, paints, varnishes, molding resins, and the like.

The examples which follow are included to aid those skilled in the art in understanding and practicing this invention and are not intended to limit the scope of the invention which is delineated by the appended claims. All parts and percentages in the examples are based on weight unless otherwise specified.

EXAMPLE 1

An organosiloxane resin containing 55 mol percent phenylmethylsiloxane units, 30 mol percent monomethylsiloxane units, and 15 mol percent monophenylsiloxane units was diluted to 50 percent solids in xylene. Five separate samples of the resin solution were taken and one was tested on panels without any additives while indium was added as indium naphthenate to each of the other samples to the extent of .05 percent, .10 percent, .50 percent and 1.00 percent respectively, of said metal based on the weight of the organosiloxane. Four series of test panels were dip coated in each of the resins and were air dried for 5 to 10 minutes and were then tested as follows: One series of panels was cured at 150° C. and the curing time of the resins was determined. Another series was similarly tested at 200° C. The third series was heated to 300° C. and periodic checks were made to determine whether the resin film would break under flex. This was accomplished by removing the test panels from the oven and bending the panel 180° around a ⅛ inch mandrel and visually checking the coating for signs of failure (e. g. cracks, craze marks, wrinkles, etc.). The time of failure under flex was recorded. The final series of test panels was subjected to heat at 300° C. until the coating crazed. The first sign of crazing was considered to be the failure point and the time for each failure was noted. The results of these tests are tabulated below in Table 1.

Table 1

| Indium | Cure Time in Hours | | Time to Failure at 300° C. | |
|---|---|---|---|---|
| | 150° C. | 200° C. | Flex Test, hours | Craze Life, hours |
| Control (none) | >15 | >15 | 168–181 | 192–205 |
| .05% | >15 | <1 | 325–365 | 264–277 |
| .10% | 2–3 | <1 | 304–317 | 264–277 |
| .50% | 1–2 | <1 | >608 | 728–741 |
| 1.00% | <1 | <1 | 264–277 | 1,224–1,237 |

The remarkable reduction in cure time and improvement in flex strength and craze life is due to the presence of indium.

EXAMPLE 2

Employing the organosiloxane resin of Example 1 and the test methods of Example 1, various concentrations of indium and cerium were added as naphthenate salts of said metals to the resin and tested. The results are set forth below in Table 2.

Table 2

| Percentage of Additives | | Cure Time in Hours | | Time to Failure at 300° C. | |
|---|---|---|---|---|---|
| Indium | Cerium | 150° C. | 200° C. | Flex, hours | Craze, hours |
| 0 | 0 | >15 | >15 | 168–181 | 192–205. |
| .05 | .05 | >15 | <1 | >608 | (See note 1.) |
| .05 | .10 | 3–6 | <1 | >616 | Do. |
| .05 | .20 | 3–6 | <1 | >616 | Do. |
| .10 | .05 | 2–3 | <1 | >616 | 752–765. |
| .10 | .10 | ------ | <1 | >608 | (See note 1.) |
| .10 | .20 | 1–2 | <1 | >616 | 752–765. |

Note 1. The coating on these panels had not crazed after 32 days at 300° C.

EXAMPLE 3

The superiority of indium as an additive over other metallic curing agents was tested by adding .05 parts of carboxylic acid salts of each of the metals listed in Table 3 to 100 parts of the organosiloxane resin of Example 1 and conducting the series of tests described in Example 1. Again a control panel was also tested.

Table 3

| Additive | Cure Time in Hours | | Time to Failure at 300° C. | |
|---|---|---|---|---|
| | 150° C. | 200° C. | Flex, hours | Craze, hours |
| None | >19 | 17–20 | 240–253 | 240–253 |
| Indium | 6–9 | <1 | 430–443 | 312–325 |
| Zinc | >19 | 1–3 | 328–341 | 240–253 |
| Iron | <1 | <1 | 5–16 | 5–16 |
| Titanium | >16 | <1 | 80–93 | 64–77 |
| Potassium | <1 | <1 | <5 | <5 |

The resins tested above were also tested for shelf life by storing these resins for 5 months and checking them after this time. The resins containing iron and potassium had gelled and were unusable, while the resin containing indium remained fluid and commercially usable.

EXAMPLE 4

The improvement in a variety of organosiloxane resins achieved with .05 parts indium and .05 parts cerium each added as a naphthenate salt to 100 parts of the resin was established with the following resins: (A) 35 mol percent monophenylsiloxane units, 25 mol percent monomethylsiloxane units, 30 mol percent dimethylsiloxane units and 10 mol per cent diphenylsiloxane units; (B) 50 mol percent dimethylsiloxane units, 45 mol percent monophenylsiloxane units, and 5 mol percent diphenylsiloxane units; (C) 40 mol percent monophenylsiloxane units, 30 mol percent phenylmethylsiloxane units, and 30 mol percent dimethylsiloxane units; (D) the resin of Example 1; (E) 38 mol percent dimethylsiloxane units, 9 mol percent phenylmethylsiloxane units, 21 mol percent monomethylsiloxane units and 32 mol percent monophenylsiloxane units; and (F) 29 mol percent phenylmethylsiloxane units, 32 mol percent monomethylsiloxane units, 33 mol percent monophenylsiloxane units, and 6 mol percent diphenylsiloxane units. Each resin was tested without additives and with the indium and cerium additives. The results of these tests are summarized in Table 4 infra.

Table 4

| Resin | Without Additives | | | With Additives | | |
|---|---|---|---|---|---|---|
| | 150° Cure, hours | 300° Flex, hours | 300° Craze, hours | 150° Cure, hours | 300° Flex, hours | 300° Craze, hours |
| A | <1 | <5 | 64–77 | <1 | <5 | 328–341 |
| B | >19 | 200–213 | 264–277 | >19 | >430 | >430 |
| C | >19 | 328–341 | >400 | >19 | >400 | >400 |
| D | <1 | 56–69 | 56–69 | >1 | >150 | >150 |
| E | 18–20 | 88–101 | 104–117 | >20 | 216–229 | 440–453 |
| F | <1 | 5–16 | 400–413 | <1 | 40–53 | >500 |

It is noted that the physical properties of these resins was significantly improved by these relatively small proportions of the additives.

EXAMPLE 5

Employing the method and organosiloxane of Example 2, equivalent results were obtained using indium and cerium octoate in place of the naphthenates.

EXAMPLE 6

Equivalent results are obtained when phenylsiloxanes, methylsiloxanes, chloroethylsiloxanes, chlorophenoxymethylsiloxanes, vinylsiloxanes, perfluorocyclopentyl siloxanes, tolylsiloxanes, benzylsiloxanes, $\alpha,\alpha,\alpha$-trifluorotolylsiloxane and/or copolymers of such siloxanes are employed in the method of Example 2.

EXAMPLE 7

Equivalent results are obtained when indium and cerium salts of acetic acid, benzoic acid, citric acid, naphthoic acid, hexoic acid and/or stearic acid are employed in the method of Example 2.

That which is claimed is:

1. A composition of matter consisting essentially of an organosiloxane of the formula $$R_n SiO_{\frac{4-n}{2}}$$

wherein R is a radical selected from the group consisting of monovalent hydrocarbon radicals, halogenated monovalent hydrocarbon radicals and halophenoxymethyl radicals, and $n$ is has an average value of from .9 to 1.7 and .001 to 5.0 percent by weight based on the weight of the organosiloxane of indium added as an indium salt of a carboxylic acid.

2. A composition of matter consisting essentially of an organosiloxane of the formula $$R_n SiO_{\frac{4-n}{2}}$$

where R is a radical selected from the group consisting of monovalent hydrocarbon radicals, halogenated monovalent hydrocarbon radicals, and halophenoxymethyl radicals, and $n$ has an average value of from .9 to 1.7, .001 to 5.0 percent by weight based on the weight of the organosiloxane of indium added as an indium salt of a carboxylic acid and up to 5 percent by weight based on the weight of the siloxane of cerium added as the cerium salt of a carboxylic acid.

3. The composition of matter of claim 1 wherein R is an alkyl radical.

4. The composition of matter of claim 2 wherein R is an alkyl radical.

5. The composition of matter of claim 1 wherein R is phenyl.

6. The composition of matter of claim 2 wherein R is phenyl.

7. The composition of matter of claim 1 wherein R is methyl.

8. The composition of matter of claim 2 wherein R is methyl.

9. The composition of claim 1 wherein the organosiloxane is a methylphenylsiloxane.

10. The composition of claim 2 wherein the organosiloxane is a methylphenylsiloxane.

11. The composition of claim 1 wherein the indium is added as indium naphthenate.

12. The composition of claim 2 wherein the indium is added as indium naphthenate and the cerium is added as cerium naphthenate.

References Cited in the file of this patent

UNITED STATES PATENTS 2,449,572   Welsh _____ Sept. 21, 1948